United States Patent [19]

Bruckert

[11] Patent Number: 5,047,762
[45] Date of Patent: Sep. 10, 1991

[54] METHOD AND APPARATUS FOR INCREASING CO-CHANNEL UTILIZATION IN A MULTI-STATION DATA COMMUNICATIONS NETWORK WITH OVERLAPPING COVERAGE

[75] Inventor: Eugene J. Bruckert, Arlington Heights, Ill.

[73] Assignee: Motorola, Inc., Schaumburg, Ill.

[21] Appl. No.: 446,828

[22] Filed: Dec. 6, 1989

[51] Int. Cl.[5] .................................. H04B 7/00
[52] U.S. Cl. .......................... 340/825.06; 455/56; 455/63; 455/67
[58] Field of Search ............... 340/825.06; 455/33, 455/34, 54, 56, 67, 68, 69, 53, 9, 10; 379/59, 63; 370/95.1

[56] References Cited

U.S. PATENT DOCUMENTS

| | | | |
|---|---|---|---|
| Re. 32,789 | 11/1988 | Lynk, Jr. et al. | 379/58 |
| 3,898,390 | 8/1975 | Wells et al. | 379/59 |
| 4,056,779 | 11/1977 | Toler | 455/11 |
| 4,056,780 | 11/1977 | Faulkner | 455/9 |
| 4,354,252 | 10/1982 | Lamb et al. | 364/900 |
| 4,435,840 | 3/1984 | Kojima et al. | 455/33 |
| 4,479,245 | 10/1984 | Batlivala et al. | 455/18 |
| 4,481,670 | 11/1984 | Freeburg | 455/33 |
| 4,525,861 | 6/1985 | Freeburg | 455/33 |
| 4,597,105 | 6/1986 | Freeburg | 455/33 |
| 4,654,867 | 5/1987 | Labedz et al. | 379/59 |
| 4,670,906 | 6/1987 | Thro | 455/56 |
| 4,677,687 | 6/1987 | Matsuo | 455/10 |
| 4,794,635 | 12/1988 | Hess | 379/60 |
| 4,876,738 | 10/1989 | Selby | 455/33 |
| 4,876,740 | 10/1989 | Levine et al. | 455/33 |

FOREIGN PATENT DOCUMENTS 8701490 3/1987 PCT Int'l Appl. .
8808647 11/1988 World Int. Prop. O. ............ 379/63

OTHER PUBLICATIONS

Tobagi, "Random Access Techniques for Data Transmission over Packet Switched Radio Networks", PhD Thesis, Chapter I, UCLA, 12/1974.
Electronic Industries Association, EIA Interim Standard: "Cellular System/Mobile Station/Compatibility Specification", IS-3-D, Mar. 1987.

*Primary Examiner*—Donald J. Yusko
*Assistant Examiner*—Dervis Magistre
*Attorney, Agent, or Firm*—Raymond A. Jenski; Rolland R. Hackbart

[57] ABSTRACT

A digital radio system having improved co-channel utilization is disclosed. A remote terminal receives a station identification from one of the fixed stations having an overlapping radio coverage area with another fixed station and retransmits this station identification with its message. A second fixed station receiving the remote terminal's transmission uses the station identification and the signal strength of the remote terminal to determine whether transmissions from other remote terminals should be inhibited. Depending upon the geographic proximity of the first fixed station to the second fixed station and the remote terminal's signal strength at the second fixed station, a signal representative of the remote terminal's signal strength at the second fixed station may be transmitted by the second fixed station. This representative signal may be used by a second remote terminal to determine whether the second remote terminal may transmit.

22 Claims, 10 Drawing Sheets

METHOD AND APPARATUS FOR INCREASING CO-CHANNEL UTILIZATION IN A MULTI-STATION DATA COMMUNICATIONS NETWORK WITH OVERLAPPING COVERAGE

BACKGROUND OF THE INVENTION

This invention relates generally to digital radio communications systems, and more particularly to techniques employed by digital radio communications systems to improve co-channel reuse.

Early systems used Carrier Sense Multiple Access (CSMA) and no frequency re-use. A variation called Busy Tone Multiple Access (BTMA) has been shown more efficient. Most applications today would employ the digital equivalent of BTMA, which might be either a repetitive bit or a repetitive field in a transmitted bitstream instead of a busy tone for inhibiting access, thus permitting the busy tone channel to carry other data. Either method could be more generally described as Busy Signal Multiple Access (BSMA).

U.S. domestic cellular radiotelephone systems, in accordance with EIA Standard IS-3-D, employ BSMA and frequency re-use. Each cell is assigned one of a plurality of Forward Control Channels designated as Access Channels, paired in radio frequency with Reverse Control Channels, and reused in such a way as to minimize interference between cells. Both the subscriber terminals (conventional cellular radiotelephones) and the base stations operate full-duplex. Repetitive bits called B/I bits positioned in the Forward Control Channel message stream provide the Busy/Idle indication. The subscriber terminal, prior to seizing an Access Channel, must first select which of the plurality it is receiving the best. It then determines its B/I status; if busy, it enters a random time-out to re-try, but if not busy, the terminal starts sending a message on the corresponding Reverse Control Channel. If the channel becomes busy before the first 56 bits of this message is sent, the terminal must immediately turn off its transmitter. Sometimes the Reverse Control Channel in a first cell receives a message from a remote subscriber terminal, the FM receiver of which is undesirably captured by a second cell using the same frequency pair. When this happens, the Forward Control Channel of the first cell will raise its busy indication, and may actually attempt to exchange messages with the subscriber station, all for naught, because the subscriber terminal's receiver is captured by the second, and the protocol and control means ultimately protects the system. Still, this effect reduces the capacity of signalling circuits.

In Motorola's radio data terminal systems of the MDC-4800 family, a plurality of full-duplex base stations, all assigned the same radio frequency pair, provide a service for a multiple of half-duplex radio terminals in a large geographic area. All base stations are connected to and controlled by a Network Control Processor (NCP), from which they get all their control instructions and transmitted data packets, and to which they send all their received data packets (along with pertinent information such as received signal strength) and all their status information. This NCP also has numerous connections to land terminals and computers, such as dedicated packet network connections, modems connected into leased landline circuits, and auto-dial and auto-answer land network modem circuits. Unlike cellular systems, the base stations are located to provide extensive coverage overlap. The NCP manages the base stations so that both overhead messages and land (or terminal) originated pages and messages toward the terminals are broadcast first by one group of (non-overlapping coverage) base stations and then another, until either the addressee responds, or the entire service area has been blanketed. In normal operation, a number of the base stations transmit simultaneously, and all base stations transmit at least some information every several minutes. Repetitive bits in the base station's transmitted stream are reserved for BSMA idle/busy indication; whenever a base station that is transmitting detects from the presence of signal above a prescribed threshold from one of the terminals, it indicates the busy state. Terminals wishing to transmit, if receiving busy state, will execute a random time-out to re-try. Base stations able to receive any packet and relay that packet, along with the received signal strength, to the NCP. The NCP, in turn, eliminates duplications and forwards the packets to the addressees. The NCP also decides which base station will reply with what packet. Because of the extensive overlap, terminals are often unnecessarily inhibited when another terminal's transmission raises the busy condition on several nearby and sometimes distant base stations, thus limiting the amount of frequency re-use.

In digital cellular telephone systems, a plurality of frequencies and a high degree of frequency re-use is anticipated. In one scheme described in U.S. Pat. No. 4,876,740, the synchronization word (called SAT/SYNC) is also used as a means of conveying a limited amount of base station site information to the subscriber terminal. The terminal selects the base station of its choice and responds with that station's SAT/SYNC, and all base stations tuned to the same radio frequency with different SAT/SYNC sequences, located at nominal re-use distances, ignore the terminal, since their synchronizing correlators are set only to receive packets in which the preamble is their own SAT/SYNC. However, for a large radio data communications network with but one heavily overlapped radio frequency pair, it is desirable for base stations to receive any message strong enough to receive it error-free; SAT/SYNC does not provide enough useful variations with good synchronizing properties for use as a base station identification number.

Therefore, it is one object of the present invention to provide, in a BSMA radio data communications system employing a plurality of full-duplex base stations assigned the same radio frequency pair, a method of effectively using, at a base station, combinations of the received signal strength of a transmitting radio terminal, that radio terminal's preference of base station and that base station's signal strength at that radio terminal in order to restrict the area of coverage over which busy signalling is broadcast, thus improving frequency re-use.

It is another object to provide, in such a communications system, a method of effectively using, at a base station, the received signal strength of a transmitting radio terminal and that terminal's preference of base station, and at a receiving radio terminal's received signal strength in order to restrict the defined busy area, thus improving frequency re-use.

DESCRIPTION OF THE PREFERRED EMBODIMENT

Figure 1:
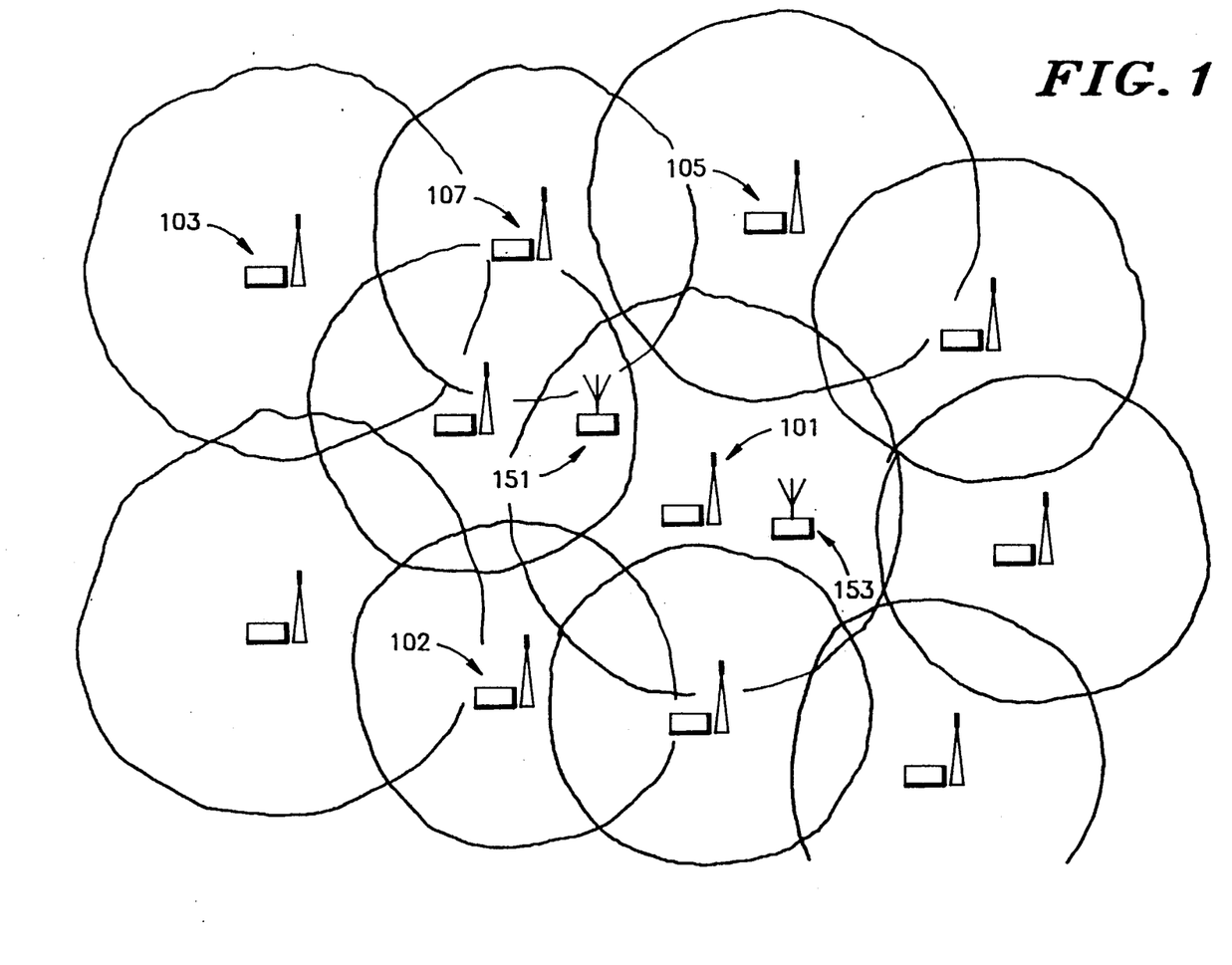
FIG. 1 illustrates a BSMA system with frequency re-use according to prior art.

In art relating to the preferred embodiment, a BSMA radio data communications system uses a plurality of fixed stations 101, 102, 103, 105 and 107 (Stations), as shown in FIG. 1, operating full duplex, all sharing the same frequency pair in order to provide service to a multiple of remotely located radio terminals 151 and 153 (Terminals) over an extended geographical area. For example, Station 101,102, and 103 may transmit simultaneously during one interval, while another group of Stations transmits during a different interval, and yet other groups transmit during other intervals. The Terminals depend upon signal strength or FM capture effect to prevent co-channel interference from concurrently transmitting stations.

When a Station is transmitting, and simultaneously receives a signal from a Terminal above a prescribed threshold, K1 (usually set as low as practical for a tolerable bit error rate), the Station raises the busy condition in its outgoing signalling in order to inhibit other Terminals from transmitting and thus interfering. For example, if Stations 101 and 103 are both transmitting with idle indication when Terminal 151 transmits, Station 101 may receive a signal from Terminal 151 with a Station Signal Strength Indication (SSSI) of 60 and Station 103 may receive a signal with an SSSI of 5. Both Stations go from idle to busy indication in known fashion as depicted by the inhibit bits 201 in FIG. 2. These busy/idle bits are interleaved within each block of data in a prescribed order, and the number of text blocks is arbitrary and usually quite large. Other Terminals receiving this transmission over a wide area are now inhibited from transmitting, so that Terminal 151 can complete its message without interference. Under some conditions Station 103 would not need to inhibit, although closer Stations, such as 105 or 107 probably would in order to prevent interference. The present invention relates to ways of reducing the number of Stations that raise and maintain the busy indication without otherwise impairing system operation thereby increasing the effective frequency re-use.

Figure 3:
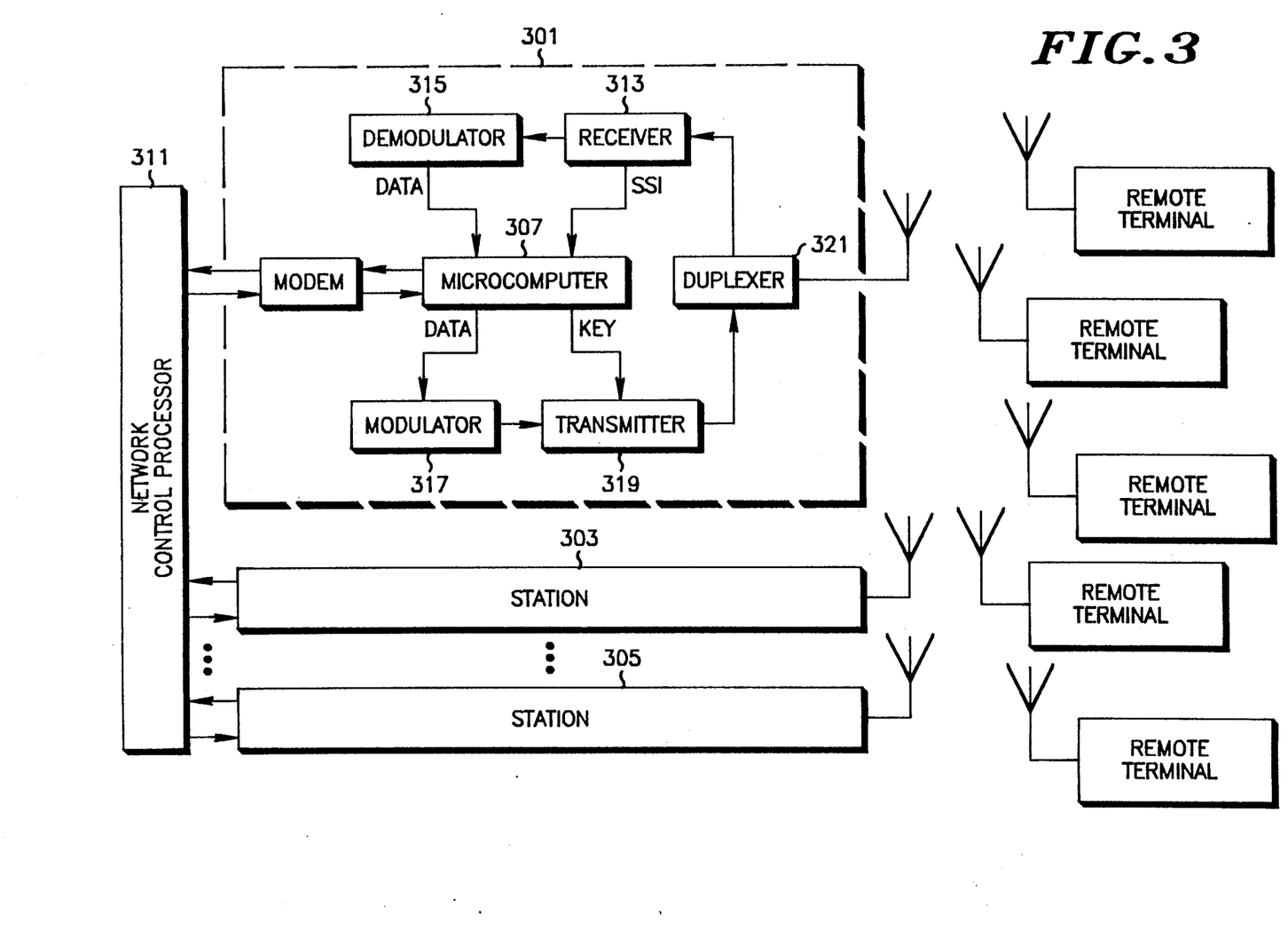
FIG. 3 is a block diagram of a BSMA radio data communications system.

FIG. 3 illustrates a block diagram of a Busy Signal Multiple Access (BSMA) system employing the present invention. A plurality of Stations 301, 303 . . . 305 are connected to, and controlled by a Network Control Processor 311, each said Station incorporating a microcomputer 307 comprising a microprocessor such as a Motorola MC, conventional memory and conventional peripheral interfaces, a receiver 313, a demodulator 315, a modulator 317, and a transmitter 319. Duplexer 321 permits use of a common transmit/receive antenna by receiver 313 and transmitter 319.

Figures 2, 4:
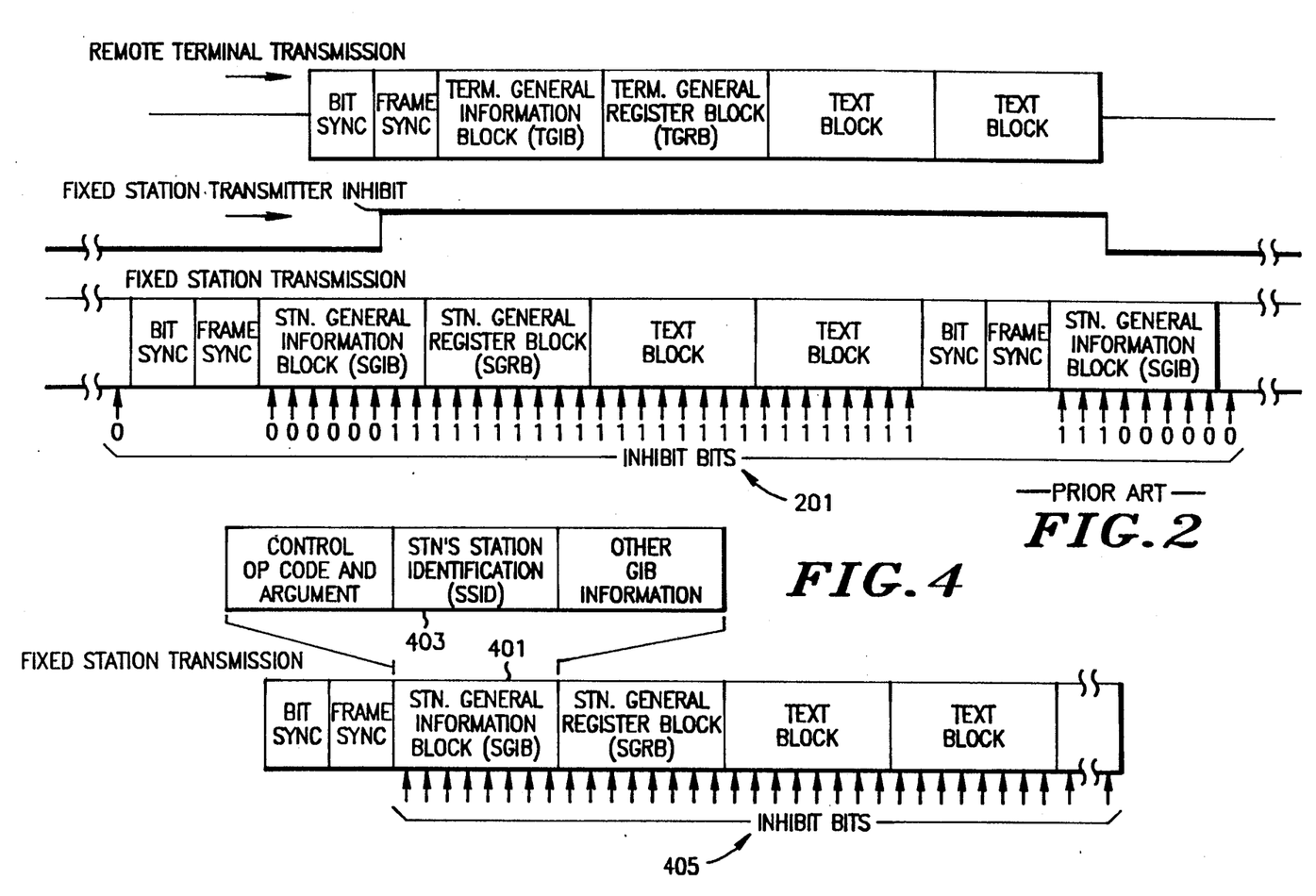
FIG. 2 is a timing diagram which illustrates inhibit operation at a fixed station receiving, from a remote terminal, a signal above a signal strength threshold according to prior art.
FIG. 4 illustrates a base station transmit message format usable in the present invention.

The Stations transmit their messages in the format of FIG. 4; each Station, when transmitting, includes, as part of its data stream, a Station General Information Block (SGIB) 401 which includes a Station's Station Identification field (SSID) 403 and, in a preferred embodiment, interleaved Inhibit Bits 405 which, if "1", inhibit the Terminals from transmitting. A Terminal is permitted to transmit if it is not receiving a Station above a prescribed threshold, K2 (usually set as low as practical for a tolerable bit error rate), or is receiving a Station with the busy/idle bit Inhibit=0.

Figure 5:
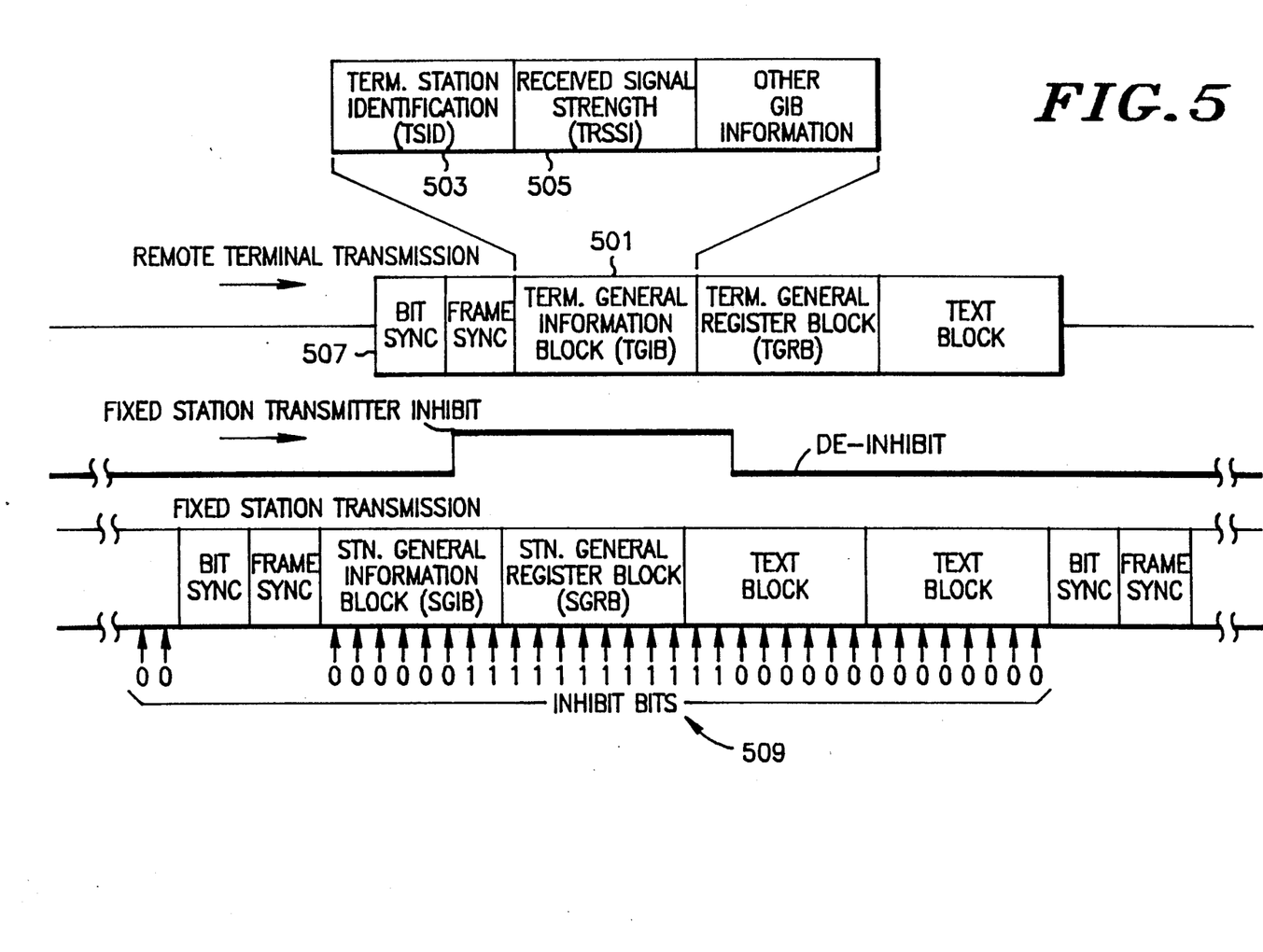
FIG. 5 is a timing diagram which illustrates a remote terminal message transmission in a format usable in the present invention and the response of a de-inhibiting fixed station in accordance with the present invention.

Whenever a Terminal transmits a message, as shown in FIG. 5, the first block of the message after word synchronization, the Terminal General Information Block (TGIB) 501, includes the identifier of the Station received with the strongest signal (TSID) 503 and a representation of that Station's Terminal Received Signal Strength Indicator (TRSSI) 505. The Stations usually transmit first one nonoverlapping group, then another, and then yet another, and may, periodically, simultaneously transmit their identification. Since the Terminals may be in motion, each Terminal, upon hearing an SGIB block 401 of FIG. 4, will update a list of SSID 403, TRSSI 505, and time, so that when it is called upon to transmit, the Terminal can select for its Terminal Station Identification (TSID), the SSID with the strongest received signal strength (TRSSI) received within a prescribed time period, and send that information in its Terminal General Information block (TGIB).

Figure 6:
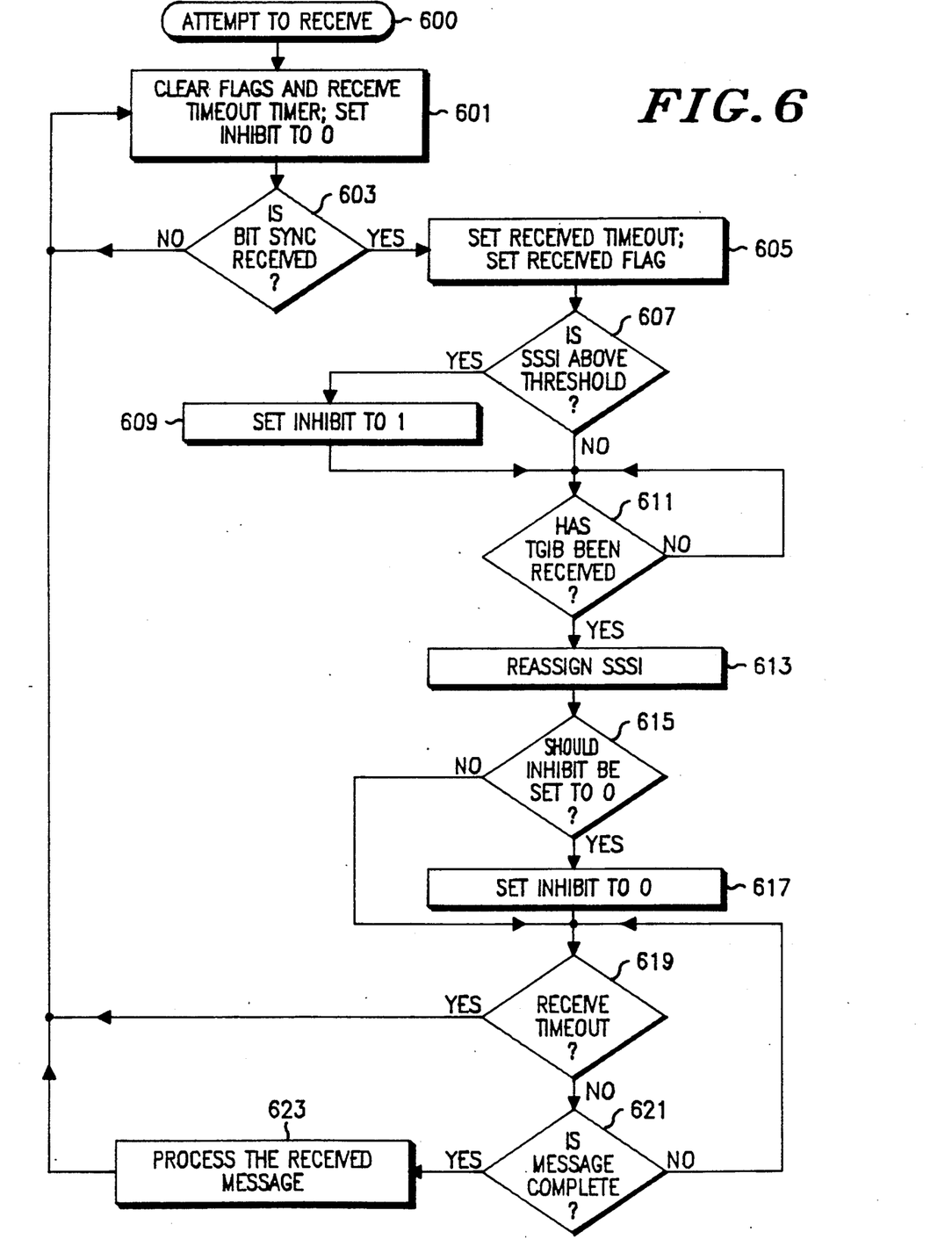
FIG. 6 is the flow chart of a base station inhibit control applicable to the present invention.

FIG. 6 depicts the flow chart of the Inhibit Control process in the microcomputer 307 of FIG. 3, which controls a Station employing the present invention. A Station enters attempt to receive at 600; initializing at 601. It recognizes, at 603, a Bit Synchronizing pattern (507 of FIG. 5) which sets the receive flag and starts reading a preliminary signal strength assessment (SSSI). If SSSI is above threshold K1 at 607, the process sets the Inhibit Bits (509 of FIG. 5) to binary "1" on its transmission at 609. After receiving and decoding TGIB (501 of FIG. 5) at 611, SSSI is again evaluated at 613 for a better assessment, so the process enters decision block 615 with SSSI, TSID and TRSSI available. This decision either sets the Inhibit Bits to zeros or leaves them alone, after which the process either times out at 619 or receives the remainder of the message at 621 and processes it at 623, then returns to the starting point 601 where the Inhibit is set to "0". (FIG. 5 depicts the case if the decision in block 615 sets the Inhibit Bits to "0". This Station is now permitting Terminals within its range to initiate transmissions, even though the Station is still receiving another Terminal. FIG. 2 depicts the case if the decision in block 615 is to leave the Inhibit=1 status unchanged).

The preferred embodiment usefully changes the Inhibit from "1" to "0" at 617 if the decision in 615 determines that:

TABLE 1

| The Terminal is geographically distant (the SSID contained in the Terminal TSID does not match any entries in a table of geographically close SSIDs) | The Terminal is geographically close | SSID not available or sent |
| --- | --- | --- |
| $\frac{TRSSI}{SSSI} > K3$ | $\frac{TRSSI}{SSSI} > K4$ | $\frac{TRSSI}{SSSI} > K13$ |
| OR | OR | OR |
| SSSI < K5 & TRSSI > K6 | SSSI < K8 & TRSSI > K9 | SSSI < K14 & TRSSI > K15 |
| OR | OR | |
| TRSSI > K7 | TRSSI > K11 | |
| OR | OR | |
| SSSI < K10 | SSSI < K12 | |

In each of the above conditions, the prescribed values (K3 through K15) will generally differ from the others. K3, in general, will be different than K4 because of the effect of eliminating the closer Stations. (It is to be noted that (TRSSI/SSSI)>K is no different than (SSSI/TRSSI)<(1/K)).

In a preferred embodiment, the Station alone makes the decision whether Terminals within receiving range are permitted to initiate a transmission. In an alternative embodiment, a Station may send an Inhibit=1 which all Terminals within receiving range must honor except that each Terminal may compare its received SSSI with the strength, TRSSI, of the Station signal carrying it. The terminal of the alternative embodiment may then use this comparison information to determine if it is permitted to transmit.

Figure 7:
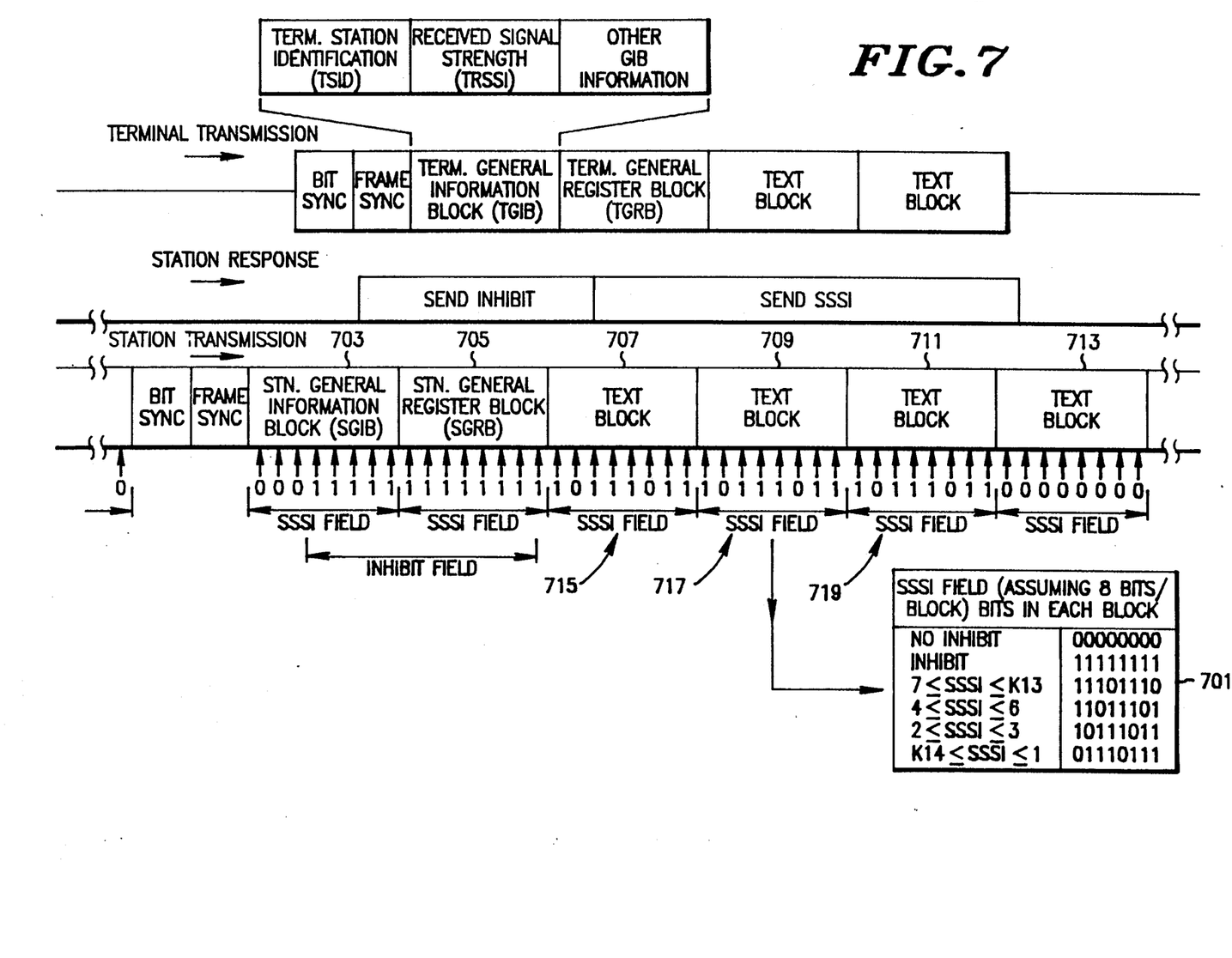
FIG. 7 is a timing diagram which illustrates a method by which a fixed station may provide received signal strength to remote terminals within its geographic radio coverage area.

FIG. 7 depicts a Station signalling format useful in the alternative embodiment in which the Terminal participates in the transmission inhibition decision. The Station sends variable length messages as a series of uniform length blocks 703, 705, 707, 709, 711, 713, ..., each block interleaving eight Inhibit Bit positions, these designated as SSSI Fields. Specific bit patterns within an SSSI Field translate to specific ranges of signal strengths SSSI per the table 701, and transmitted as SSSI Fields 715, 717, and 719. Contiguous strings of "0" greater than two (as in blocks 703 and 713) are translated as "Inhibit=0" and strings of "1" greater than five (as in blocks 703 and 705) as "Inhibit=1". The Station sends the following information in the SSSI Field:

1. If the TSID in the received signal is that of a geographically close Station, the Station sends Inhibit=1.
2. If the TSID in the received signal is that of a geographically distant Station, the Station sends:
   1. Inhibit=1 if the SSSI>K16, or
   2. SSSI if K16≧SSSI≧K17, or
   3. Inhibit=0 if SSSI<K17.

Figure 8:
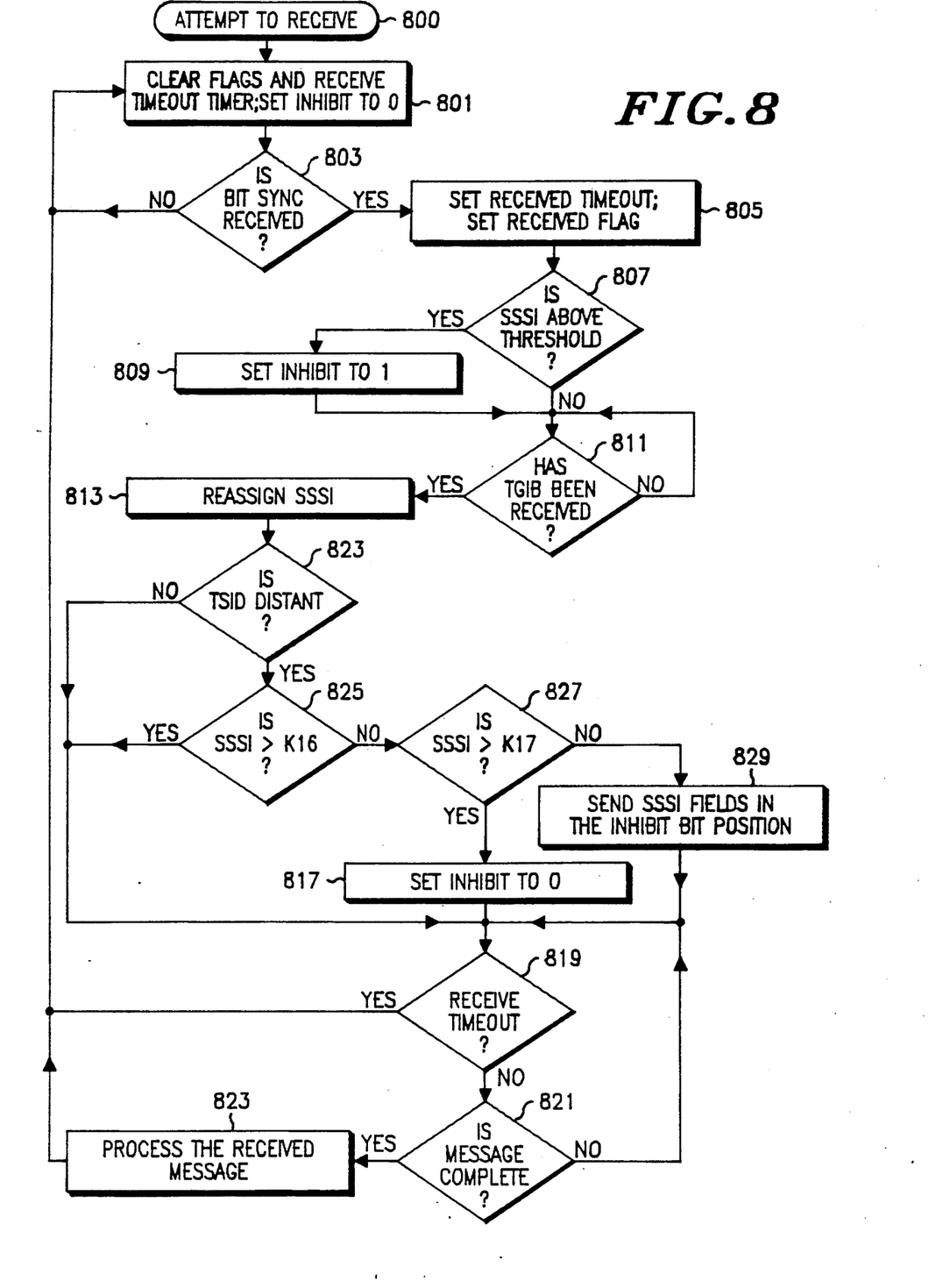
FIG. 8 is a flow chart of a fixed station inhibit and signal strength transmission control employed in the present invention.

FIG. 8 depicts the flow chart of the Inhibit control process in the microcomputer 307 of FIG. 3 which controls a Station of the alternative embodiment. The steps 800 through 813 are similar to the corresponding steps 600 through 613 of FIG. 6, so the process enters decision block 823 with an updated SSSI, TRSSI, and TSID. At 823, if TSID is not of a geographically distant station, then the process enters block 819 with Inhibit=1. If distant, the process enters decision block 825, wherein SSSI is compared to a prescribed value K16. If SSSI is greater than K16, the process enters block 819 with Inhibit=1. If not, the process enters decision block 827, wherein SSSI is compared to a prescribed value K17, which is smaller than K16. If less than K17, Inhibit is set to "0" at 817, and the process continues at 819. If SSSI is greater than K17 (and therefore lies in magnitude between K16 and K17), then the process enters block 829, wherein the SSSI is converted to the appropriate 8 bit representation SSSI Field as depicted in FIG. 7 at 701. This Field is transmitted with each block during execution of the loop of 819 and 821 until the Receive Time-Out has expired (at 819) or the transmitting Terminal has completed its message (at 821) and the message processed (at 823), after which the Inhibit is returned to "0" at 801. The value of K16 is relatively low, so that if SSSI is less than K16, it is likely that another Station is receiving the Terminal with a larger SSSI. The value of K17 is even lower, usually set as low as practical for a tolerable bit error rate.

Figure 9:
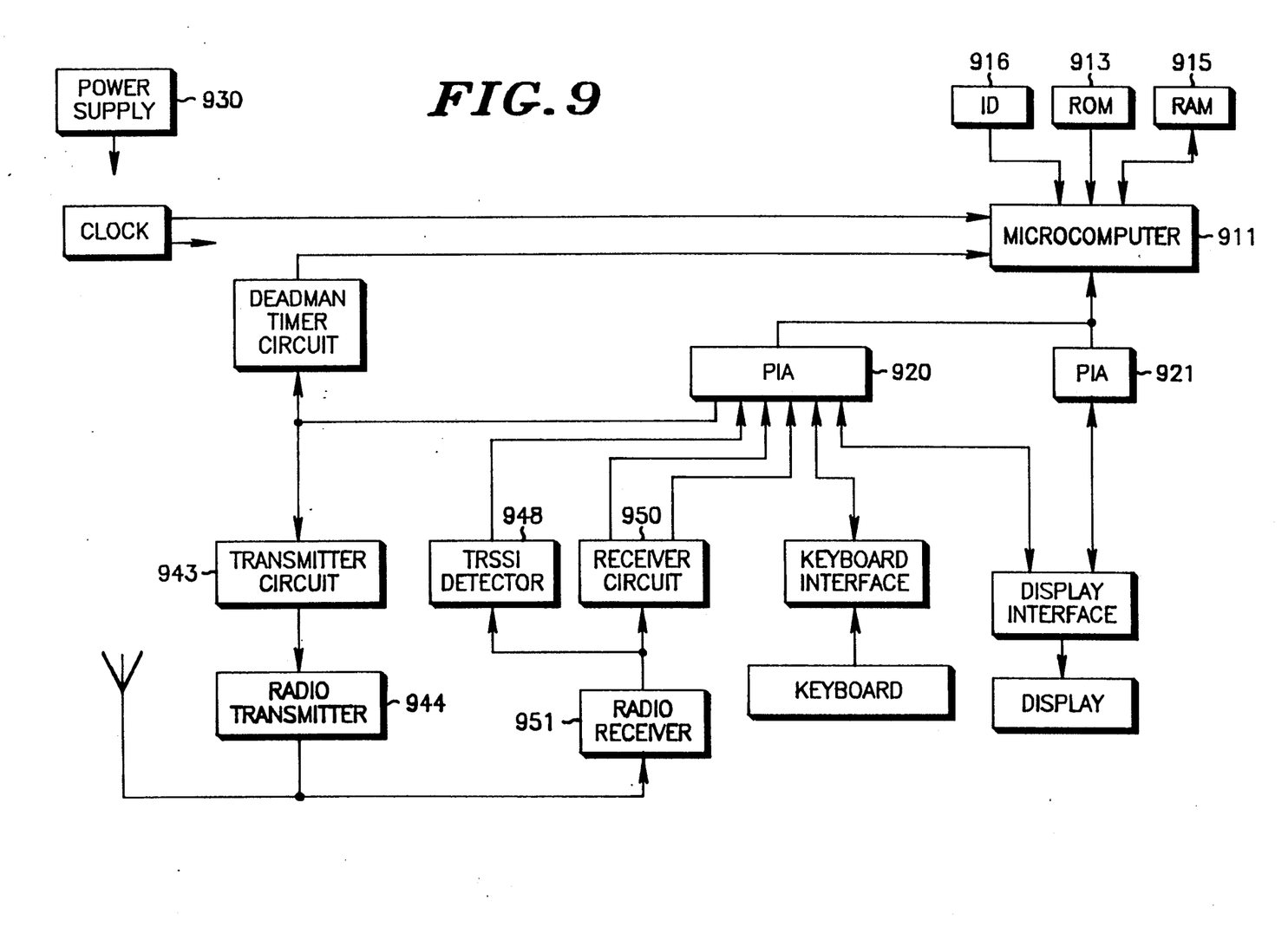
FIG. 9 is a block diagram of the major elements of a microcomputer controlled radio data remote terminal employed in the present invention.

FIG. 9 depicts a microcomputer controller of a Terminal which may be employed in the present invention. This controller is similar to that described in U.S. Pat. No. 4,354,252. The controller components include a microprocessor 911, which may be an M6800 microprocessor, manufactured by Motorola, Inc., which is coupled by a multiline connection 912 to a read only memory (ROM) 913 which contains stored program steps for operation of the microprocessor 911. Also coupled to the microprocessor 911 by a bi-directional multi-line connection 914 is a random access memory (RAM) 915 which is used for temporary storage of information by the microprocessor 911. Also contained in the controller is circuitry relating to identification of a particular terminal, designed ID 916, which is connected to the microprocessor. Also connected to the microprocessor are two programmable interface adaptors PIA, 920, 921 which are coupled to other circuits by signal lines and which couple signals either to or from the microprocessor 911. A keyboard interface circuit 923 is coupled to the PIA 920 by means of bi-directional signal lines. A power supply circuit 930 as is known in the art, is provided for obtaining properly regulated voltage supplies for the system circuitry.

A clock source circuit 941 provides appropriate outputs to the microprocessor 911 and other appropriate circuits. A transmitter interface circuit 943 couples to a conventional radio transmitter 944 and is coupled to the microprocessor 911 via PIA 920. A push to talk and timeout timer circuit 945, as is known in the art, is coupled to the microprocessor directly and indirectly through PIA 920. A TRSSI detector 948, which detects the received signal strength of a signal received from a Station, and a receiver interface circuit 950 are coupled to a conventional radio receiver 951. Both the TRSSI detector 948 and the receiver interface circuit are coupled to the microprocessor 911 via independent inputs to PIA 920. The microprocessor 911 operates in accordance with a program which:
1. Includes a real time clock,
2. Records the SSID, TRSSI and time of at least the Stations having the strongest and next strongest signal received by the Terminal, and
3. When preparing to transmit, examines TRSSI, and if above a selected threshold, extracts the SSSI Field from the received message.

Analog to digital conversion of signal strength measurement is well known in prior art and commonly used in domestic cellular radiotelephones. Likewise, a real time clock and its application to time stamping information for process control is well known (see, for example, U.S. Pat. No. 4,644,351). The same can be said for the processes of merging and separating interleaved messages, as the SSSI Fields of the message blocks of the transmitted and received bitstream.

Figure 10:
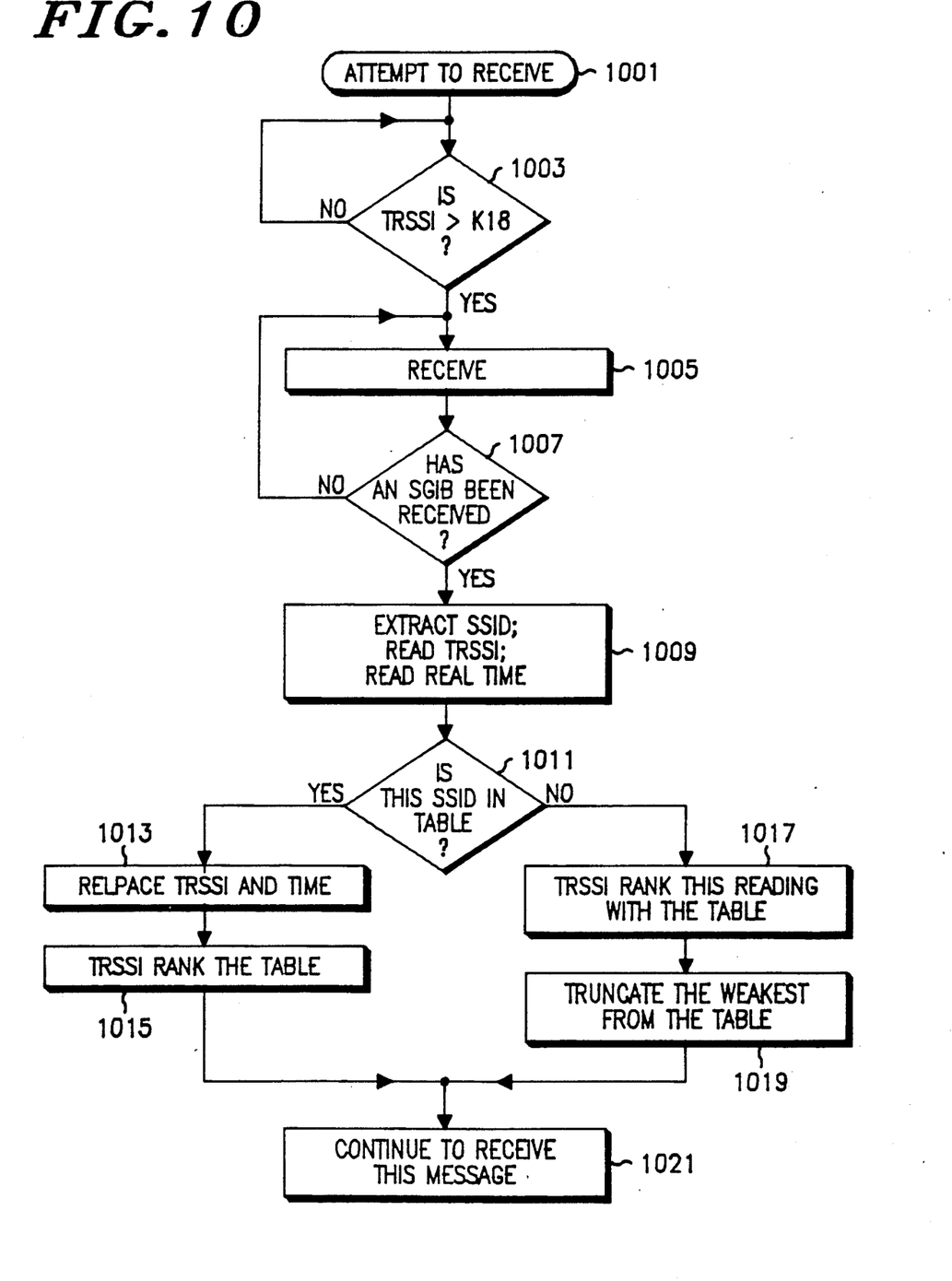
FIG. 10 is a flow chart of the process used by a remote terminal to manage a table of recently received fixed station signals.

Whenever a Terminal is first turned on, it initializes a table of N entries of SSID, TRSSI, and time, setting TRSSI values to zero. N is usually ten or less. FIG. 10 depicts a flow chart of the process that manges the table of N entries (N Table). When not transmitting, a Terminal is attempting to receive messages transmitted by the Stations at 1001. When the TRSSI is above threshold K18 at 1003, the process listens for received signals at 1005, reading at least the SGIB block and the addressee information. Whenever, the Terminal receives an SGIB block at 1007, it proceeds to extract the SSID, read the TRSSI detector (to determine the signal strength of this particular Station), and read the real time clock to time stamp this information. The process then checks at 1011 to see if this SSID is in the N Table, and, if so, replaces the older TRSSI/time at 1013 and rank orders the N Table according to TRSSI at 1015 before continuing at 1021. If the SSID is not already in the N Table, at 1017 it rank orders, by TRSSI, the new reading with the N Table, and then, at 1019, truncates the lowest in rank (to maintain an N Table of the N strongest TRSSIs) and then continues at 1021. If the Terminal determines that it is the addressee of the particular message, it reads the entire message).

A Terminal in which other processes generate a request to transmit must first select the SSID that will be sent as TSID along with its TRSSI in the TGIB block. It is then permitted to transmit if it is not at that moment receiving a signal above the prescribed threshold K18. If the Terminal is receiving a signal above the K18 threshold, it may elect to transmit in the alternative embodiment provided the following conditions are met:
1. The Station being received is sending Inhibit=0, or
2. The Station being received is sending SSSI, AND (TRSSI/SSSI)>K19.

Figure 11:
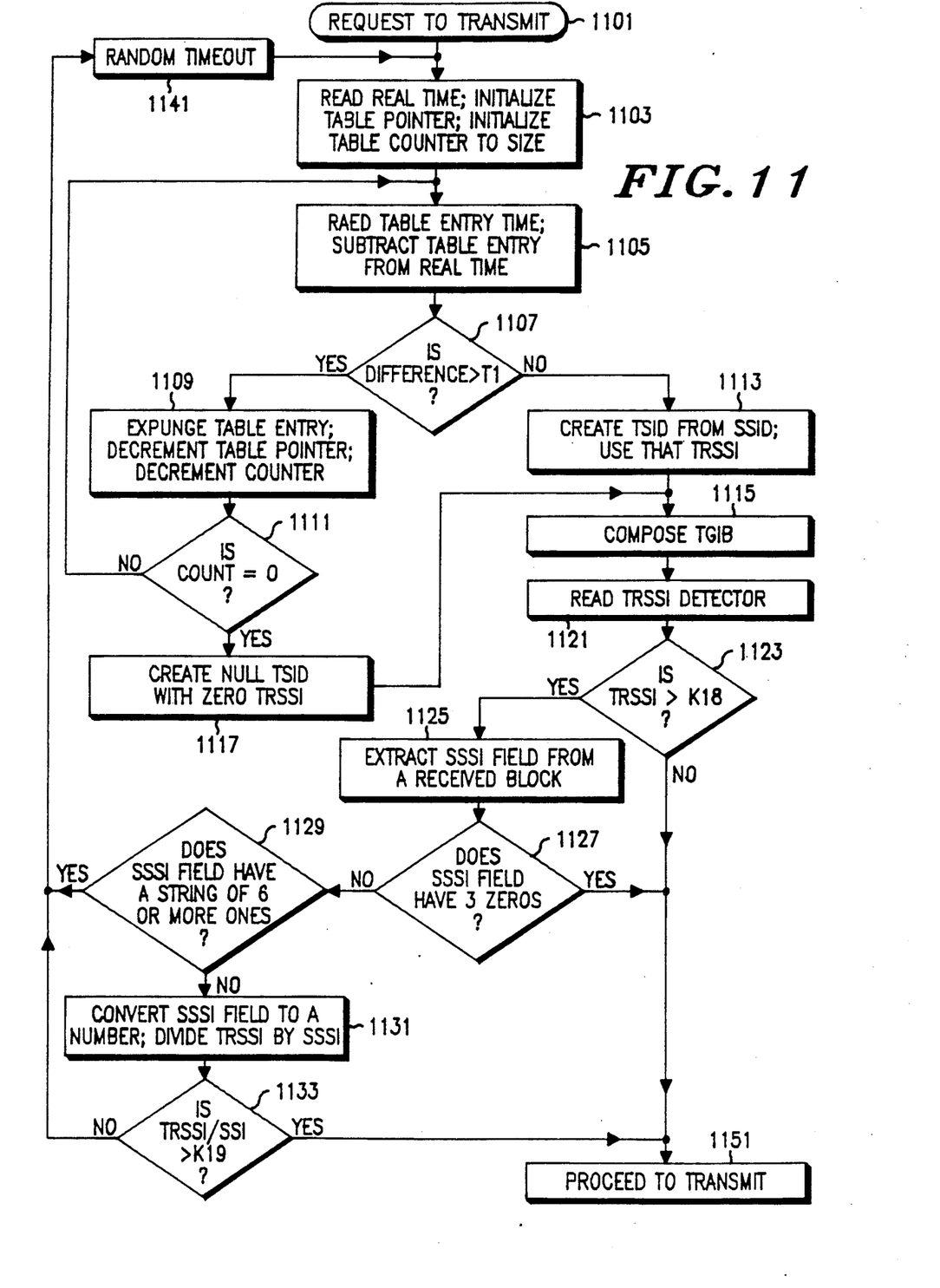
FIG. 11 is a flow chart of the process that controls transmitter keying of a remote terminal employed in the present invention.

If these conditions are not met, then the process enters a random timeout after which it repeats the request to transmit. FIG. 11 is a flow chart of the SSID selection and initiation of transmit, starting from a Request to Transmit at 1101. To select the SSID for use as TSID at 1103, the real time clock is read, a table pointer is initialized to the top of the table, and a size counter is initialized to the table size. The process then enters a loop in which time from the table entry is subtracted from current time, at 1105, and if the difference, at 1107, is greater than T1, the entry is expunged from the table and the process decrements the table pointer and the size counter at 1109. If the count has not reached 0 at 1110, the loop is repeated until an entry in the table is found with a time difference equal to or less than T1 at 1107. The corresponding SSID and the corresponding TRSSI are used, at 1113, to create the TGIB of the forthcoming transmit message at 1115. If none of the table entries are more recent than present time minus T1, then, when the count is zero at 1111, a "NULL TSID" is created at 1117, permitting composition of the TGIB at 1115.

Having composed a TGIB at 1115 of FIG. 11, the process now decides whether the transmitter may be keyed or the process must start over after a random time interval. This decision is made by first reading the incoming signal strength TRSSI at 1121. Then, at 1123, if TRSSI is not greater than a prescribed signal strength level K18 at 1123, the Terminal may immediately proceed to transmit at 1151. If the incoming signal is above K18, then the process extracts the SSSI Field from the most recently received block of data at 1125 and checks, at 1127, whether the Inhibit condition is ZERO in which case it proceeds to transmit at 1151. If the Inhibit is not ZERO at 1127, then the process checks, at 1129, whether it is ONE, in which case it enters random timeout at 1141. Otherwise, at 1131, it converts the SSSI field into a number normalized to TRSSI and performs the division TRSSI/SSSI. Then at 1133, it compares this ratio with a prescribed ratio K19. If grater than K19, the process proceeds to transmit at 1151, but if not, the process enters random timeout 1141 before commencing a retry.

TI is a prescribed constant greater than the maximum time it takes all the system's Stations to transmit at least once. K18 is usually set as low as practical for a tolerable bit error rate. The value of K19 is prescribed such that the receiving Terminal receives a transmitting Station much stronger than that Station is receiving a different (transmitting) Terminal, so that if the receiving Terminal were to transmit, it would override the other Terminal at that Station.

Thus, a method and apparatus have been shown and described by which it is possible to decrease the area of busy signalling in a BSMA radio data communications system employing a plurality of full-duplex base stations assigned the same radio frequency pair, thus increasing the capabilities for frequency re-use.

Therefore, while this invention has been shown and described above, it is to be understood that the invention is not to be taken as limited to the specific embodiments herein and that changes and modifications may be made without departing from the true spirit of the invention. It is therefore contemplated to cover the present invention and any and all such changes and modifications, by the appended claims.

I claim:

1. A method of increasing co-channel utilization in a digital radio communications system having at least two fixed stations each transmitting into and receiving from a geographic radio coverage area on the same duplex radio channel, the geographic radio coverage area of one fixed station overlapping at least a portion of the geographic radio coverage area of a second fixed station, and a plurality of remote terminals having the capability of receiving from and transmitting to at least one of the at least two fixed stations, the method comprising the steps of:

transmitting a station identification from a first one of the at least two fixed stations;

receiving said station identification at one of the plurality of remote terminals;

transmitting a message including said received station identification from said one of the plurality of remote terminals from the portion of the geographic radio coverage areas which overlap;

receiving said message including said received station identification at a second one of the at least two fixed stations;

transmitting an inhibit signal from said second one of the at least two fixed stations in response to said message reception, whereby at least a second of the plurality of remote terminals is prevented from transmitting;

determining a signal strength level of said received message at said second one of the at least two fixed stations; and transmitting from said second one of the at least two fixed stations a no-inhibit signal when said signal strength is less than a first predetermined value.

2. A method in accordance with the method of claim 1 further comprising the step of transmitting from said second one of the at least two fixed stations to at least said second of the plurality of remote terminals a representation of said signal strength level when said signal strength level exceeds a second predetermined value but does not exceed a third predetermined value.

3. A method in accordance with the method of claim 1 further comprising the steps of:

determining, at said one of the plurality of remote units, a signal strength measure of said received station identification;

transmitting, from said one of the plurality of remote units, said measure as an inclusion in said message;

calculating, at said second one of the at least two fixed stations, a ratio of said measure received in said message to said signal strength level; and transmitting from said second one of the at least two fixed stations a no-inhibit signal when said calculated ratio exceeds a fourth predetermined value.

4. A method in accordance with the method of claim 1 further comprising the steps of:

determining, at said one of the plurality of remote units, a signal strength measure of said received station identification;

transmitting, from said one of the plurality of remote units, said measure as an inclusion in said message; and transmitting from said second one of the at least two fixed stations a no-inhibit signal when said measure exceeds a predetermined measure.

5. A method for a fixed station to increase co-channel utilization in a digital radio communications system, the system having at least two fixed stations each transmitting an associated station identification and messages into and receiving messages from a geographic radio coverage area on the same duplex radio channel, the geographic radio coverage area of a first fixed station overlapping at least a portion of the geographic radio coverage area of a second fixed station, and a plurality of remote terminals having the capability of receiving the station identifications and messages from and transmitting messages to at least one of the first and second fixed stations, the method at the second fixed station comprising the steps of:

receiving at the second fixed station a message including a received station identification from one of the plurality of remote terminals from the portion of the geographic radio coverage areas which overlap;

transmitting an inhibit signal from the second fixed station in response to said message reception whereby at least a second of the plurality of remote units is prevented from transmitting;

determining at the second fixed station if said received station identification in said received message is of the first fixed station;

determining a signal strength level of said received message at the second fixed station; and transmitting from the second fixed station a no-inhibit signal when said signal strength is less than a first predetermined value.

6. A method in accordance with the method of claim 5 further comprising the step of transmitting from the fixed station to at least said second of the plurality of remote terminals a representation of said signal strength level when said signal strength level exceeds a second predetermined value but does not exceed a third predetermined value.

7. A method in accordance with the method of claim 5 wherein said step of receiving a message at said second fixed station further comprises the step of receiving a signal strength measure of the station identification received at said one of the plurality of remote terminals.

8. A method in accordance with the method of claim 7 further comprising the steps of:

calculating, at said second fixed station, a ratio of said signal strength measure to said signal strength level; and transmitting from said second fixed station a no-inhibit signal when said calculated ratio exceeds a fourth predetermined value.

9. A method for enabling a remote terminal to transmit in a digital radio communications system while increasing co-channel utilization, the system having at least two fixed stations each transmitting a station identification and messages into and receiving messages from remote terminals in a geographic radio coverage area on the same duplex radio channel, the geopraphic radio coverage area of one fixed station overlapping at least a portion of the geographic radio coverage area of a second fixed station, and the remote terminals having the capability of receiving the station identifications and messages from and transmitting messages to at least one of the at least two fixed stations, the method at the remote terminal comprising the steps of:

receiving the message and the station identification from one of the fixed stations;

determining a signal strength of said received message and station identification;

comparing said signal strength to a first predetermined value;

determining, in response to said signal strength exceeding said first predetermined value, if a no-inhibit signal has been transmitted from said one of the fixed stations; and transmitting a message if said no-inhibit signal is determined to have been transmitted.

10. A method in accordance with the method of claim 9 further comprising the step of determining, in response to said signal strength exceeding said first predetermined value, if a signal representative of a signal strength received by said one of the fixed stations has been transmitted from said one of the fixed stations.

11. A method in accordance with the method of claim 10 further comprising the steps of generating a ratio of said signal representative of a signal strength to said determined signal strength of said received message; comparing said ratio to a second predetermined value; and transmitting a message if said ratio exceeds said second predetermined value.

12. A digital radio communications system having improved co-channel utilization and employing at least two fixed stations each transmitting into and receiving from a geographic radio coverage area on the same duplex radio channel, the geographic radio coverage area of one fixed station overlapping at least a portion of the geographic radio coverage area of a second fixed station, and a plurality of remote terminals having the capability of receiving from and transmitting to at least one of the at least two fixed stations, the digital radio communications system comprising:

means for transmitting a station identification from a first one of the at least two fixed stations;
means for receiving said station identification at one of the plurality of remote terminals;
means for transmitting a message including said received station identification from said one of the plurality of remote terminals from the portion of the geographic radio coverage areas which overlap;
means for receiving said message including said received station identification at a second one of the at least two fixed station;
means for transmitting an inhibit signal from said second one of the at least two fixed stations in response to said message reception, whereby at least a second of the plurality of remote terminals is prevented from transmitting;
means for determining a signal strength level of said received message at said second one of the at least two fixed stations; and
means for transmitting from said second one of the at least two fixed stations a no-inhibit signal when said signal strength is less than a first predetermined value.

13. A digital radio communications system in accordance with claim 12 further comprising means for transmitting from said second one of the at least two fixed stations to at least said second of the plurality of remote terminals a representation of said signal strength level when said signal strength level exceeds a second predetermined value but does not exceed a third predetermined value.

14. A digital radio communications system in accordance with claim 12 further comprising:
means for determining, at said one of the plurality of remote units, a signal strength measure of said received station identification;
means for transmitting, from said one of the plurality of remote units, said measure as an inclusion in said message;
means for calculating, at said second one of the at least two fixed stations, a ratio of said measure received in said message to said signal strength level; and
means for transmitting from said second one of the at least two fixed stations a no-inhibit signal when said calculated ratio exceeds a fourth predetermined value.

15. A digital radio communications system in accordance with claim 12 further comprising:

means for determining, at said one of the plurality of remote units, a signal strength measure of said received station identification;
means for transmitting, from said one of the plurality of remote units, said measure as an inclusion in said message; and
means for transmitting from said second one of the at least two fixed stations a no-inhibit signal when said measure exceeds a predetermined measure.

16. A fixed station for a digital radio communications system having improved co-channel utilization, the system having at least two fixed stations each transmitting an associated station identification and messages into and receiving messages from a geographic radio coverage area on the same duplex radio channel, the geographic radio coverage area of a first fixed station overlapping at least a portion of the geographic radio coverage area of a second fixed station, and a plurality of remote terminals having the capability of receiving the station identifications and messages from and transmitting messages to at least one of the first and second fixed stations, the second fixed station comprising:

means for receiving a message including a received station identification from one of the plurality of remote terminals from the portion of the geographic radio coverage areas which overlap;
means for transmitting an inhibit signal from the second fixed station in response to said message reception whereby at least a second of the plurality of remote units is prevented from transmitting;
means for determining if said received station identification in said received message is of the first fixed station;
means for determining a signal strength level of said received message at the second fixed station; and
means for transmitting a no-inhibit signal when said signal strength is less than a first predetermined value.

17. A fixed station in accordance with claim 16 further comprising means for transmitting a representation of said signal strength level to at least said second of the plurality of remote terminals when said signal strength level exceeds a second predetermined value but does not exceed a third predetermined value.

18. A fixed station in accordance with claim 16 wherein said means for receiving a message at said second fixed station further comprises means for receiving a signal strength measure of the station identification received at said one of the plurality of remote terminals.

19. A fixed station in accordance with claim 18 further comprising:
means for calculating, at said second fixed station, a ratio of said signal strength measure to said signal strength level; and
means for transmitting from said second fixed station a no-inhibit signal when said calculated ratio exceeds a fourth predetermined value.

20. A remote terminal for a digital radio communications system having improved co-channel utilization, the system having at least two fixed stations each transmitting a station identification and messages into and receiving messages from remote terminals in a geographic radio coverage area on the same duplex radio channel, the geographic radio coverage area of one fixed station overlapping at least a portion of the geographic radio coverage area of a second fixed station, and the remote terminals having the capability of receiving the station identifications and messages from and transmitting messages to at least one of the at least two fixed stations, the remote terminal comprising:
- means for receiving the message and the station identification from one of the fixed stations;
- means for determining a signal strength of said received message and station identification;
- means for comparing said signal strength to a first predetermined value;
- means for determining, in response to said signal strength exceeding said first predetermined value, if a no-inhibit signal has been transmitted from said one of the fixed stations; and
- means for transmitting a message if said no-inhibit signal is determined to have been transmitted.

21. A remote terminal in accordance with claim 20 further comprising means for determining, in response to said signal strength exceeding said first predetermined value, if a signal representative of a signal strength received by said one of the fixed stations has been transmitted from said one of the fixed stations.

22. A remote terminal in accordance with claim 21 further comprising:
- means for generating a ratio of said signal representative of a signal strength to said determined signal strength of said received message;
- means for comparing said ratio to a second predetermined value; and
- means for transmitting a message if said ratio exceeds said second predetermined value.

* * * * *